United States Patent [19]

Coran et al.

[11] 4,419,499

[45] Dec. 6, 1983

[54] COMPOSITIONS OF URETHANE RUBBER AND NYLON

[75] Inventors: Aubert Y. Coran; Raman Patel; Debra Williams, all of Akron, Ohio

[73] Assignee: Monsanto Company, St. Louis, Mo.

[21] Appl. No.: 361,703

[22] Filed: Mar. 25, 1982

[51] Int. Cl.³ .............................................. C08L 77/00
[52] U.S. Cl. .................................... 525/424; 525/403
[58] Field of Search ............................. 525/424, 403

[56] References Cited

U.S. PATENT DOCUMENTS

| | | | |
|---|---|---|---|
| 3,225,007 | 12/1965 | Gruber et al. | 525/403 |
| 4,174,358 | 11/1979 | Epstein | 525/526 |
| 4,338,413 | 7/1982 | Coran et al. | 525/179 |

*Primary Examiner*—John C. Bleutge
*Assistant Examiner*—A. L. Carrillo
*Attorney, Agent, or Firm*—Larry R. Swaney

[57] ABSTRACT

Compositions are described comprising blends of cured millable urethane rubber and nylon.

20 Claims, No Drawings

COMPOSITIONS OF URETHANE RUBBER AND NYLON

COMPOSITIONS OF URETHANE RUBBER AND NYLON

This invention relates to compositions comprising blends of nylon and cured urethane rubber.

BACKGROUND OF THE INVENTION

Thermoplastics are compositions which can be molded or otherwise shaped and reprocessed at temperatures above their melting or softening points. Thermoplastic elastomers (elastoplastics) are materials which exhibit both thermoplastic and elastomeric properties, i.e., the materials can be processed as thermoplastics but they have physical properties like elastomers. Shaped articles may be formed from thermoplastic elastomers by extrusion, injection molding or compression molding without the time-consuming cure step required with conventional vulcanizates. Elimination of the time required to effect vulcanization provides significant manufacturing advantages. Further, thermoplastic elastomers can be reprocessed without the need for reclaiming, and, in addition, many thermoplastics can be thermally welded.

Moldable thermoplastic compositions of nylon and thermoplastic urethane rubber containing high proportions of nylon and exhibiting high impact strength are known but such compositions are rigid materials of high stiffness and low elongation (Epstein, U.S. Pat. No. 4,174,358). Moldable elastoplastic compositions of nylon and cured high unsaturation diene rubbers containing high proportions of rubber are known (A. Y. Coran and R. Patel, U.S. Pat. No. 4,173,556).

SUMMARY OF THE INVENTION

It has been discovered that compositions comprising blends of (a) thermoplastic nylon and (b) cured millable urethane rubber exhibit a valuable combination of properties. Generally, compositions comprising about 10–75 parts by weight of nylon and, correspondingly, about 90–25 parts by weight of cured millable urethane rubber are moldable thermoplastic compositions exhibiting improved strength, greater elongation, greater toughness or impact resistance, or improved true stress at break. A preferred composition comprises a blend of about 25–65 parts by weight of nylon and, correspondingly, about 75–35 parts by weight of cured millable urethane rubber. Cross-linking the rubber increases the tensile strength and improves tension set and toughness of the composition. In addition, cross-linking (curing or vulcanizing) the rubber improves the solvent resistance and the high temperature properties of the blend. The properties of the composition improve as the extent of cross-linking the rubber increases. In compositions of the invention, the rubber is cured to the extent that no more than 35 weight percent of the rubber is extractable in a rubber solvent, for example, dichloromethane. In preferred compositions, the millable urethane rubber is cured to the extent that no more than 25 weight percent, preferably no more than 20 weight percent of the rubber is extractable in a solvent in which uncured millable urethane rubber is essentially completely soluble. Compositions comprising 55 or more parts by weight of nylon, per 100 parts by weight of both the nylon and the cured millable urethane rubber, are generally thermoplastic resinous compositions exhibiting improved impact resistance. Compositions comprising 45 or more parts by weight of cured millable urethane rubber per 100 parts by weight of both the said rubber and the nylon are generally elastomeric. When compositions containing high proportions of rubber are statically cured, such as in molds, thermoset compositions are obtained; whereas, if such compositions are dynamically cured, i.e., if the blend is masticated while the rubber is cured, elastoplastic compositions are obtained which compositions exhibit elastomeric properties and yet are processable as thermoplastics.

The relative proprotions of nylon and cured (vulcanized or cross-linked) rubber of the elasto-plastic compositions of the invention are not subject to absolute delineation because the limits vary, due to a number of factors including type, molecular weight, or molecular weight distribution of the nylon or rubber, and type and amount of curative (cross-linker) used to cure the rubber. In elastoplastic compositions, the amount of nylon must be sufficient to impart thermoplasticity to the compositions, and the amount of cured rubber must be sufficient to impart rubberlike elasticity to the composition. The term "rubberlike elasticity" means for the composition to have a tension set value of about 50% or less. The range of proportions for which the compositions are elastoplastic may be ascertained in a few simple experiments by those skilled in the art by following the teachings herein. Generally, elastoplastic compositions of the invention are blends which comprise about 10–55 parts by weight of nylon and correspondingly about 90–45 parts by weight of cured millable urethane rubber per 100 total parts by weight of nylon and rubber. Blends containing lower proportions of nylon exhibit better (lower) tension set, whereas, blends containing higher proportions of nylon generally exhibit high stress-strain (strength) properties, including true stress at break, TSB.

It is important for thermoplasticity that the cured rubber is present in the form of small dispersed particles, otherwise, the compositions will either be weak or not processable as thermoplastics. If the rubber is not dispersed and forms a somewhat continuous phase throughout the blend, a thermoset composition, not processable as a thermoplastic, may be obtained. The dispersed rubber particles must be small enough to maintain strength and thermoplasticity of the composition. If the particles are too large, weak, low strength blends are obtained. Compositions containing still larger particles may not be processable as thermoplastics. Accordingly, it is understood that, in elastoplastic compositions of the invention, the particle size is small enough to maintain high strength and thermoplasticity. Generally, the cured rubber particles are of a size of about 50 microns number average or less. The smaller the particle size the better the properties, including strength and processability. Preferably, the particle size is about 10 microns number average or less. The dynamic curing process, when carried out properly, can give cured rubber particles within the range of about 0.1 to 2 microns number average, one micron=one micrometer, um.

In order to achieve the improved compositions of the invention, it is essential that the rubber is cured with enough rubber curative so that the rubber is cured sufficiently to give a composition having a substantially greater ultimate tensile strength than a corresponding blend containing uncured rubber. Preferably sufficient rubber curative is used to also give a three fold or more increase in tensile strength. In a preferred composition, the extent of cure of the rubber is such that the true stress at break, TSB, is at least two times the TSB of the similar blend in which the rubber is uncured.

It should be understood that, although the "extent of cure" of the rubber is measured as an inverse function of the amount of rubber extractable in a solvent for the uncured rubber (alternately measured as a direct function of the amount of insoluble rubber, referred to as rubber gel), the actual extent of cure of the rubber may be somewhat misindicated thereby, because of the effect of curative upon the nylon and because of the interaction between the nylon and rubber. For example, if the curative causes chain scission of the nylon, the amount of extractable material would be high; this could be misleading and would indicate a lower extent of cure of the rubber. On the other hand, if a graft is formed between the rubber and nylon, the graft would be less soluble which would indicate a greater extent of cure of the rubber. For these reasons, the extent of cure of the rubber in the compositions of the invention may be different than what the solubility data indicates. However, even with these limitations of the solubility test, the data clearly shows that good compositions are obtained whenever sufficient curative is used so that no more than 35 weight percent of the "apparent" rubber is extractable by a rubber solvent. "Apparent" rubber is the amount of rubber in the composition plus curative minus the amount of virgin nylon soluble in the rubber solvent. Preferred compositions are obtained with less than 25% rubber extractable and more preferred compositions with less than 20% or even 15% rubber extractable.

Elastoplastic compositions of the invention are preferably prepared by a dynamic vulcanization process which comprises masticating a mixture of melted nylon, millable urethane rubber, and curative until curing is complete. Conventional rubber masticating equipment, for example, Banbury mixers, Brabender mixers, and mixing extruders, may be used to carry out the dynamic vulcanization process. The nylon and millable urethane rubber typically are mixed at a temperature above the nylon melting point, after which curative is added. Mastication at vulcanization temperatures is continued until vulcanization is complete, generally within a few minutes, depending on the temperature. To obtain thermoplastic elastomeric compositions, it is desirable that mixing continues without interruption until vulcanization is complete. If appreciable curing is allowed after mixing has stopped, a thermoset unprocessable composition may be obtained. Frequently, the cured blend is removed from the mixer and cooled, then returned and masticated again above the melting point of the nylon. The additional mastication step may generally improve the processability of the composition, especially when higher proportions of rubber are used. For further details concerning dynamic vulcanization and determination of the extent of cure of the rubber, refer to the Coran et al patent, supra, particularly Columns 3 and 4.

The particular results obtained by the aforesaid dynamic curing process are a function of the particular rubber curing system selected. Preferably, enough curative is used to cross-link the rubber to the extent that the cross-link density of the rubber is of the order of about $3 \times 10^{-5}$ to $3 \times 10^{-4}$ moles per milliliter of rubber. Of course, the cross-link density should not be too high lest the properties of the composition be impaired.

One embodiment of the invention consists of a thermoset composition comprising a blend of nylon and cured millable urethane rubber which is in the form of a continuous network rather than being in particulate form. Thermoset compositions of the invention are prepared by first blending nylon and millable urethane rubber at a temperature sufficient to melt the nylon by using conventional masticating equipment. The composition is then worked on a rubber roll mill where curatives are incorporated therein at a temperature below the activation temperatures of the curative system. (The temperatures can also be below the melting point of the nylon in which case the nylon would be a dispersed phase, especially after mill working.) The curable composition is then sheeted by passage through the roll mill or a shaped specimen is otherwise prepared. The sheet or shaped specimen is then cured by conventional means, typically by heating under pressure. The specimens may be cured either above or below the melting point of the nylon. When a specimen is cured below the melting point of the nylon, the physical properties of the cured specimen may be dependent upon the direction of measurement because of orientation of nylon particles. The degree of anisotropy of any particular specimen depends upon the proportions of nylon in the blend and the degree of orientation. Orientation of the nylon particles can be conveniently achieved by passing a sheeted material one or more times through the rolls of an even speed mill.

Methods other than dynamic vulcanization can be utilized to prepare elastoplastic compositions of the invention. For example, millable urethane rubber can be fully vulcanized in the absence of the nylon, comminuted, and mixed with molten nylon. Provided that the cured rubber particles are small, well dispersed and in an appropriate concentration, compositions within the invention are obtained by blending cured millable urethane rubber and nylon. In addition, providing enough nylon is present, thermoplastic compositions may be prepared by masticating a blend of nylon and millable urethane rubber, incorporating curatives and then curing under static conditions, such as, in a mold.

Thermoplastic compositions of the invention are all processable in an internal mixer, to give products which, upon transferring at temperatures above the softening or crystallizing point of the nylon to the rotating rolls of a rubber mill, form continuous sheets. The sheets are reprocessable in the internal mixer, after reaching temperatures above the softening or melting point of the nylon. The material is again transformed to the plastic state (molten state of the nylon) but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, thermoplastic compositions of the invention are further processable to the extent that articles may be formed therefrom by extrusion, injection molding or calendering.

Millable urethane rubbers satisfactory for the practice of the invention are essentially amorphous polymers comprising diol and diisocyanate segments. The diol segments may comprise either polyether or polyester segments or both. Millable urethane rubber (also known as urethane millable gums) should not be confused with thermoplastic polyurethane. Urethane millable gums are thermosetting as opposed to thermoplastic polyurethane (either in resin or elastomeric form) which are processable as thermoplastics. Millable urethane rubbers may be processed on a mill at relatively low temperatures, 80° C. or less, even at room temperature, as contrasted with thermoplastic polyurethanes which have melting points in excess of 100° C. or more, often above 150° C. For other differences between millable urethane rubbers and thermoplastic polyurethanes, see *Encyclopedia of Polymer Sience and Technology*, Vol. 11, pages 548–549, the disclosure of which is incorporated herein by reference. Commercially available millable urethane rubbers (gums) are described in *Rubber World Blue Book*, 1981 Edition, Materials and Compounding Ingredients for Rubber, pages 401–406.

Examples of suitable vulcanizing agents either used alone or as co-agents are organic peroxides, diamines including low molecular weight amine-terminated polyamides, m-phenylene bismaleimide, triallylisocyanurate, alkylene di- and triacrylates, and with certain urethane rubbers, sulfur and sulfur donor vulcanizing agents.

Preferred curing agents are free-radical initiators, for example, organic peroxides having decomposition temperatures between 100°–250° C. This is because free-radical initiators are believed to cause graft formation between the nylon and millable urethane rubber, in addition to causing curing of the rubber. Accordingly, the preferred elastoplastic compositions of the invention are prepared by masticating for about 1–10 minutes at a temperature above the melting point of the nylon, a blend of nylon, millable urethane rubber, and 0.1 to 3 parts by weight of a free-radical initiator per 100 parts by weight of nylon and rubber combined.

Suitable thermoplastic nylons comprise crystalline or resinous, high molecular weight solid polymers including copolymers and terpolymers having recurring amide units within the polymer chain. Both fiber-forming and molding grade nylons are satisfactory. Nylons having a molecular weight of 10,000 or more are especially suitable. Crystalline nylons having softening or melting points between 100°–230° C. are preferred. More preferred nylons melt between about 150° and 210° C. Examples of suitable nylons are described in Coran et al patent, supra, particularly Column 7, lines 4–30, the disclosure of which is incorporated herein by reference.

The properties of the compositions of the invention may be modified by addition of ingredients which are conventional in the compounding of millable urethane rubber and nylon. Examples of such ingredients include carbon black, silica, titanium dioxide, pigments, clay, silanes, titanates or other coupling agents, stabilizers, antidegradants, plasticizers, processing aids, adhesives, tackifiers, waxes, and discontinuous fibers such as wood cellulose or glass fibers, etc. The addition of particulate filler, preferably prior to dynamic vulcanization is particularly recommended. Preferably, the particulate filler is masterbatched with the millable urethane rubber and the masterbatch is then mixed with the nylon. Typical additions of particulate fillers or reinforcement fillers such as carbon black comprise about 20–150 parts by weight of filler per 100 parts by weight of rubber. The amount of particulate filler which can be used depends, at least in part, upon the type of filler and the presence of other ingredients such as plasticizers.

Thermoplastic compositions of the invention are useful for making a variety of articles such as tires, hoses, belts, gaskets, moldings and molded parts. They are particularly useful for making articles by extrusion, injection molding and compression molding techniques. Compositions of the invention also are useful for blending with other thermoplastics, in particular, various nylons, and polyester resins. The compositions of the invention are blended with thermoplastics by using conventional mixing equipment. The properties of the blend depend upon the proportions.

Tensile properties of the compositions are determined by ASTM procedure D-1708-66. Specimens are pulled with a tensile tester at 2.54 centimeters per minute to 30% elongation and then 25.4 centimeters per minute to failure. The term "elastomeric" as used herein and in the claims means having the property of forcibly retracting within ten minutes to less than 160% of its original length after being stretched at room temperature to twice its unstressed length and held for ten minutes before release. True stress at break (TSB) is the tensile strength at break multiplied by the extension ratio also at break, the extension ratio being the length of a tensile test specimen at break divided by the original, unstressed length of the test specimen. Alternately, extension ratio is 1.00 plus 1/100 of the percent ultimate elongation. Especially preferred compositions of the invention are rubbery compositions having tension set values of about 50% or less, which compositions approximate the definition for rubber as defined by ASTM Standards, Vol. 28, page 756 (D1566). A more preferred composition has a Shore D hardness of 60 below or a 100% modulus between 2–20 MPa (megapascals) or a Young's modulus below about 600 MPa.

DESCRIPTION OF THE PREFERRED EMBODIMENTS

Compositions illustrating the invention are prepared by charging nylon and millable urethane rubber, in the indicated amounts (all parts by weight) to a Brabender mixer or Haake Rheocord mixer at about 160°–220° C., depending upon the nylon melting temperature, and at a mixing speed of about 50–120 rpm, generally, 80 rpm after the nylon is melted. The rubber and nylon are mixed for a sufficient time to melt the nylon and to obtain a uniform blend (about 2–3 minutes). Curative is added and mastication is continued (generally between 2 and 6 minutes) until maximum Brabender consistency is reached. The composition is removed, cooled, and then returned to the mixer and mixed an additional 2–2½ minutes. The material is then sheeted and compression molded at about 200°–225° C., again depending upon the nylon melting temperatures. Properties of the molded sheet are then measured and recorded.

Materials used to illustrate the invention are as follows: the millable urethane rubber is an ether-based urethane rubber, Adiprene®CM, or an ester-based urethane rubber, Elastothane E-640. The nylons used are nylon 11, m.p. ≈190° C., a polymer of 11-aminoundecanoic acid, and nylon 6,6-6,6-10, m.p. 160° C., a terpolymer of the monomers of nylon 6, (50%), nylon 6-6, (31%), and nylon 6-10, (19%). The curatives are: trimethylol propane triacrylate, SR-351; m-phenylenebismaleimide, HVA-2; 2,5-dimethyl-2,5-di(-tert-butyperoxy)hexane, Lupersol®101, and triallyl cyanurate, TAC.

Compositions comprising blends of nylon 6, 6-6, 6-10 and millable urethane rubber, Adiprene®CM, in which the rubber is cured with a curative system comprising organic peroxide and TAC coagent are shown in Table 1. The effect of the proportions of rubber and nylon is also shown. A free radical scavenger and heat stabilizer, trisnonylphenyl phosphite, Polygard ®, is added and mixed for one minute after the rubber is cured. Control stocks are prepared without curatives. The data show that curing the rubber substantially improves the properties. For example, curing improves tensile strength, tension set and true stress at break, TSB, in all compositions. Cured compositions containing 50 weight percent or less of nylon are elastomeric. The low solubility of the rubber in the cured compositions is indicative of the extent of cure of the rubber. The rubber solubility is calculated by assuming that all of the curative becomes insoluble rubber and correcting for 5.25% of the nylon which is soluble in $CH_2Cl_2$. Comparison of rubber solubility of Stocks 9 and 11 illustrate that curing has a dramatic effect upon properties.

Compositions of the invention prepared with different curatives are illustrated in Table 2. The compositions are prepared as described above. A stabilizer system comprising equal parts by weight of (a) Polygard, (b) Staboxyl PCD, a polycarbodiimide hydrolysis inhibitor, and (c) Flectol H, polymerized 1,2-dihydro-2,2,4-trimethylquinoline, is added to all the compositions. Stock 1 is a control without curatives. The differences in rubber solubility indicate that extent of cure of the rubber varies depending upon the efficiency and amount of curative used, but the data shows that all compositions having a soluble rubber content of 21% or less exhibit excellent properties.

Compositions comprising different nylons and different millable urethane rubbers are illustrated in Table 3. The stabilizer system is the same as in Table 2. The data shows that substantial improvements in properties are achieved upon curing.

TABLE I

| | (Parts by Weight) | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Nylon 6, 6-6, 6-10 | 10 | 10 | 20 | 20 | 30 | 30 | 40 | 40 | 40 | 40 | 40 | 50 | 50 | 60 | 60 | 70 | 70 |
| Adiprene CM | 90 | 90 | 80 | 80 | 70 | 70 | 60 | 60 | 60 | 60 | 60 | 50 | 50 | 40 | 40 | 30 | 30 |
| TAC | — | 0.9 | — | 0.8 | — | 1.05 | — | 0.9 | 0.9 | 0.9 | 0.6 | — | 0.75 | — | 0.6 | — | 0.45 |
| Lupersol ® 101 | — | 0.09 | — | 0.04 | — | 0.14 | — | 0.3 | 0.18 | 0.12 | 0.03 | — | 0.25 | — | 0.2 | — | 0.15 |
| Polygard | — | 0.45 | — | 0.4 | — | 0.35 | — | 0.3 | 0.3 | 0.3 | 0.3 | — | 0.25 | — | 0.2 | — | 0.15 |
| Properties | | | | | | | | | | | | | | | | | |
| UTS, MPa | 0.1 | 4.0 | 0.4 | 6.9 | 0.9 | 13.1 | 1.0 | 18.5 | 18.6 | 18.1 | 9.8 | 1.0 | 26.5 | 8.9 | 31.7 | 26.2 | 33.4 |
| $M_{100}$, MPa | 0.4 | 1.2 | 0.5 | 2.5 | 0.6 | 8.4 | 0.8 | 10.2 | 9.9 | 11.1 | 6.1 | 0.8 | 17.9 | 7.2 | 17.7 | 11.8 | 20.5 |
| E, MPa | 0.6 | 1.5 | 0.9 | 3.2 | 1.3 | 35 | 1.4 | 31 | 102 | 106 | 17 | 15 | 245 | 97 | 478 | 406 | 577 |
| Ult. Elong., % | 1550 | 250 | 1610 | 260 | 1160 | 190 | 670 | 220 | 280 | 230 | 260 | 390 | 210 | 200 | 290 | 320 | 310 |
| Ten. Set, % | 47 | 4 | 40 | 8 | 40 | 15 | 45 | 21 | 39 | 40 | 26 | 55 | 45 | 71 | 60 | 70 | 65 |
| TSB, MPa | — | 14 | 7 | 25 | 12 | 38 | 8 | 59 | 70 | 60 | 35 | 5 | 82 | 27 | 124 | 110 | 137 |
| $CH_2Cl_2$ Extractable, % of total composition | 91 | 23 | 69 | 20 | 58 | 15 | 51 | 14 | 16 | 10 | 23 | 58 | 6 | 35 | 7 | 21 | 11 |
| Rubber Extractable, % of rubber including curatives | 100 | 24 | 85 | 23 | 81 | 18 | 82 | 20 | 22 | 13 | 35 | 100 | 6 | 80 | 10 | 57 | 22 |

TABLE 2

| | (Parts by Weight) | | | | | |
|---|---|---|---|---|---|---|
| | 1 | 2 | 3 | 4 | 5 | 6 |
| Nylon 6, 6-6, 6-10 | 40 | 40 | 40 | 40 | 40 | 40 |
| Adiprene CM | 60 | 60 | 60 | 60 | 60 | 60 |
| TAC | — | — | — | 0.3 | — | — |
| HVA-2 | — | — | — | — | 0.3 | — |
| SR-351 | — | — | — | — | — | 0.3 |
| Lupersol ® 101 | — | 0.6 | 0.45 | 0.24 | 0.24 | 0.24 |
| Stabilizer | 0.6 | 0.9 | 0.9 | 0.9 | 0.9 | 0.9 |
| Properties | | | | | | |
| UTS, MPa | 3.9 | 24.2 | 21.2 | 18.4 | 20.3 | 20.7 |
| $M_{100}$, MPa | 2.7 | 13.4 | 14.5 | 12.8 | 13.1 | 8.9 |
| E, MPa | 5.5 | 77 | 129 | 146 | 150 | 99 |
| Ult. Elong., % | 330 | 220 | 190 | 200 | 240 | 310 |
| Ten. Set, % | 44 | 24 | 29 | 39 | 45 | 42 |
| TSB, MPa | 17 | 78 | 61 | 55 | 68 | 86 |
| $CH_2Cl_2$ Extractables, % of total composition | 49 | 7 | 9 | 11 | 16 | 11 |
| Rubber Extractables, % of rubber including curatives | 71 | 7 | 10 | 14 | 21 | 13 |

TABLE 3

| | (Parts by Weight) | | | |
|---|---|---|---|---|
| | 1 | 2 | 3 | 4 |
| Nylon 11 | 40 | 40 | — | — |
| Nylon 6, 6-6, 6-10 | — | — | 50 | 50 |
| Adiprene CM | 60 | 60 | — | — |
| Elastothane E-640 | — | — | 50 | 50 |
| Stabilizer | 1.8 | 1.8 | 1.5 | 1.5 |
| Lupersol ® 101 | — | 0.6 | — | 0.5 |
| Properties | | | | |
| UTS, MPa | 6.3 | 22.1 | 7.2 | 27.9 |
| $M_{100}$, MPa | — | 14.0 | 5.5 | 12.8 |
| E, MPa | 134 | 69 | 105 | 202 |
| Ult. Elong., % | 26 | 230 | 220 | 300 |
| Ten. Set, % | — | 31 | 92 | 81 |
| TSB, MPa | 8 | 72 | 23 | 111 |

TABLE 4

| | Static Cured | Dynamic Cured |
|---|---|---|
| UTS, MPa | 25.9 | 21.7 |
| $M_{100}$, MPa | 11.9 | 9.8 |
| E, MPa | 14.1 | 28.1 |
| Ult. Elong., % | 240 | 220 |
| Ten. Set, % | 10 | 15 |
| TSB, MPa | 88 | 70 |

To illustrate a static cured composition, 0.96 parts by weight of dicumyl peroxide (Dicup ®) is mixed on a mill at about 50° C. with a blend of 40 parts by weight of nylon 6, 6-6, 6-10 and 60 parts by weight of millable urethane rubber (Adiprene CM). The composition is vulcanized in a mold at 155° C. for 20 minutes. A composition of the same recipe is prepared by dynamic vulanization at 160° C. The vulcanizate properties are shown in Table 4. The static cured composition is a thermoset. The dichloromethane extractable is 4.6 weight percent. Although the dynamic cured composition exhibits some slightly inferior properties, it is processable as a thermoplastic.

Although the invention has been illustrated by typical examples, it is not limited thereto. For example, similar results are obtained with Nylon 6-9 (Vydyne®60H, Monsanto). Changes and modifications of the invention herein chosen for purposes of disclosure can be made which do not constitute departure from the spirit and scope of the invention.

The embodiments of the invention in which an exclusive property or privilege is claimed are defined as follows:

1. A composition comprising a blend of about 10-75 parts by weight of nylon, and, correspondingly, about 90-25 parts by weight of cured millable urethane rubber in which the curing agent consists essentially of an organic peroxide.

2. The composition of claim 1 which comprises about 25-65 parts by weight of nylon, and correspondingly, about 75-35 parts by weight of cured millable urethane rubber.

3. The composition of claim 2 which comprises 45 or more parts by weight of millable urethane rubber per 100 parts by weight of rubber and nylon combined, and which is elastomeric.

4. The composition of claim 3 in which the rubber is in the form of discrete dispersed particles and the composition is processable as a thermoplastic.

5. The composition of claim 4 in which the rubber is cured to the extent that no more than 35 weight percent of the rubber is extractable in a solvent in which uncured millable urethane rubber is essentially completely soluble.

6. The composition of claim 5 in which the rubber is cured to the extent that no more than 25 weight percent of the rubber is extractable in dichloromethane at room temperature.

7. The composition of claim 6 in which the nylon has a melting point between about 100°-230° C.

8. The composition of claim 7 in which the millable urethane rubber is an essentially amorphous polymer comprising diol and diisocyanate segments.

9. An elastoplastic composition comprising a blend of nylon, in an amount sufficient to impart thermoplasticity to the composition, and cured millable urethane rubber in the form of dispersed particles of a size small enough to maintain thermoplasticity of the composition and which rubber is present in an amount sufficient to impart rubberlike elasticity to the composition in which the curing agent consists essentially of an organic peroxide.

10. The composition of claim 9 comprising a blend of about 20-55 parts by weight of nylon, and correspondingly, about 80-45 parts by weight of cured millable urethane rubber.

11. The composition of claim 10 in which the cured rubber particle size is about 50 microns number average or less.

12. The composition of claim 11 in which the cured rubber particle size is about 10 microns or less number average.

13. The composition of claim 12 in which the cured rubber particle size is 2 microns or less.

14. The composition of claim 13 in which the rubber is cross-linked to the extent that the cross-link density of the rubber is about $3 \times 10^{-5}$ to $3 \times 10^{-4}$ moles per milliliter of rubber.

15. The composition of claim 14 in which the nylon has a melting point between about 150°-210° C.

16. The composition of claim 15 in which the millable urethane rubber is an essentially amorphous polymer comprising diol and diisocyanate segments.

17. The composition of claim 16 in which the nylon is Nylon 6, 6-6, 6-10 or Nylon 6,9.

18. The composition of claim 16 in which the nylon is Nylon 11 or Nylon 12.

19. The composition of claim 10 prepared by masticating, for about 1-10 minutes at a temperature above the melting point of the nylon, the aforesaid blend of nylon, millable urethane rubber and 0.1 to 3 parts by weight of an organic peroxide per 100 parts by weight of nylon and rubber.

20. The composition of claim 19 in which the organic peroxide is 2,5-dimethyl-2,5-di(tert-butyperoxy)hexane or dicumyl peroxide.

* * * * *